(12) United States Patent
Du et al.

(10) Patent No.: US 8,813,199 B2
(45) Date of Patent: *Aug. 19, 2014

(54) METHOD FOR REALIZING CONVERGENT WAPI NETWORK ARCHITECTURE WITH SEPARATE MAC MODE

(75) Inventors: Zhiqiang Du, Shaanxi (CN); Jun Cao, Shaanxi (CN); Manxia Tie, Shaanxi (CN); Xiaolong Lai, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 297 days.

This patent is subject to a terminal disclaimer.

(21) Appl. No.: 13/203,645

(22) PCT Filed: Dec. 14, 2009

(86) PCT No.: PCT/CN2009/075536

§ 371 (c)(1),
(2), (4) Date: Aug. 26, 2011

(87) PCT Pub. No.: WO2010/096995

PCT Pub. Date: Sep. 2, 2010

(65) Prior Publication Data

US 2011/0307943 A1    Dec. 15, 2011

(30) Foreign Application Priority Data

Feb. 27, 2009 (CN) .......................... 2009 1 0021423

(51) Int. Cl.
| G06F 15/16 | (2006.01) |
|---|---|
| H04L 29/06 | (2006.01) |
| H04W 12/06 | (2009.01) |
| H04W 84/12 | (2009.01) |

(52) U.S. Cl.
CPC .............. *H04W 12/06* (2013.01); *H04L 63/10* (2013.01); *H04W 84/12* (2013.01); *H04L 63/08* (2013.01)
USPC .................... 726/5; 726/3; 709/229; 370/255

(58) Field of Classification Search
USPC ............................. 726/5, 3; 709/229; 370/255
See application file for complete search history.

(56) References Cited

U.S. PATENT DOCUMENTS

| 6,788,658 | B1 * | 9/2004 | Bims ............................. 370/328 |
|---|---|---|---|
| 7,991,152 | B2 * | 8/2011 | Gueron et al. .................. 380/28 |
| 8,086,749 | B2 * | 12/2011 | Townsley et al. ............. 709/230 |
| 8,335,490 | B2 * | 12/2012 | Kaippallimalil .............. 455/411 |
| 2005/0044249 | A1 * | 2/2005 | Teng et al. .................... 709/230 |
| 2005/0182830 | A1 | 8/2005 | Abhishek et al. |
| 2006/0129807 | A1 | 6/2006 | Halasz et al. |
| 2008/0072047 | A1 * | 3/2008 | Sarikaya et al. .............. 713/171 |
| 2008/0117477 | A1 | 5/2008 | Fujise |
| 2008/0134288 | A1 | 6/2008 | Halasz et al. |
| 2008/0295144 | A1 | 11/2008 | Cam-Winget et al. |
| 2009/0052674 | A1 | 2/2009 | Nishida et al. |
| 2010/0217986 | A1 * | 8/2010 | Schneider ..................... 713/171 |
| 2011/0058670 | A1 | 3/2011 | Ala-Laurila et al. |
| 2011/0307621 | A1 | 12/2011 | Lai et al. |
| 2011/0307943 | A1 | 12/2011 | Du et al. |
| 2011/0310771 | A1 | 12/2011 | Tie et al. |

FOREIGN PATENT DOCUMENTS

| CN | 1681239 A | 10/2005 |
|---|---|---|
| CN | 1691582 A | 11/2005 |
| CN | 1905504 A | 1/2007 |
| CN | 1996840 | 7/2007 |
| CN | 101155396 | 4/2008 |
| CN | 101192923 A | 6/2008 |
| CN | 101577904 A | 11/2009 |
| CN | 101577905 | 11/2009 |
| CN | 101577978 A | 11/2009 |
| WO | WO-2005081567 A1 | 9/2005 |
| WO | WO-2008069520 A1 | 6/2008 |
| WO | WO-2008080351 A1 | 7/2008 |

OTHER PUBLICATIONS

Xiang Wang, et al., "Communication Protocol of Centralized WLAN Architecture," Computer Engineering, Nov. 2008, vol. 34, No. 22, pp. 115-117.

International Search Report (in Chinese with English translation) and Written Opinion (in Chinese) for PCT/CN2009/075536, mailed Mar. 25, 2010; ISA/CN.

Zhao-Hui Tang et al. "On the Security of WAI Protocol in the Third Version of WAPI." International Conference on Intelligent Information Hiding and Multimedia Signal Processing. 2008.

Qiang Tang. "On the Security of Three Versions of the WAI Protocol in Chinese WLAN Implementation Plan." Second International Conference on Communications and Networking in China. 2007.

Li Huixian and Pang Liaojun. "Improvement on WLAN multicast key management protocol." 2008 International Conference on Computational Intelligence and Security.

International Search Report (English and Chinese) and Written Opinion of the ISA (Chinese), ISA/CN, Beijing, China, mailed Mar. 18, 2010.

International Search Report regarding Application No. PCT/CN2009/075539, mailed Mar. 25, 2010.

Chinese Office Action regarding Application No. 200910021422.6, dated Jul. 12, 2010. Summary provided by Unitalen Attorneys at Law.

U.S. Office Action regarding U.S. Appl. No. 13/203,643, mailed Mar. 21, 2013.

U.S. Office Action regarding U.S. Appl. No. 13/203,646, mailed Feb. 13, 2013.

Liufei Wu et al. "Security Analysis of WAPI Authentication and Key Exchange Protocol." 2007.

Final U.S. Office Action regarding U.S. Appl. No. 13/203,646, mailed Aug. 5, 2013.

Applicant Initiated Interview Summary regarding U.S. Appl. No. 13/203,646, mailed Oct. 24, 2013.

Final U.S. Office Action regarding U.S. Appl. No. 13/203,643, mailed Jul. 23, 2013.

Notice of Allowance regarding U.S. Appl. No. 13/203,643, mailed Oct. 4, 2013.

U.S. Office Action regarding U.S. Appl. No. 13/203,646, dated Feb. 21, 2014.

\* cited by examiner

*Primary Examiner* — Amare F Tabor

(74) *Attorney, Agent, or Firm* — Harness, Dickey & Pierce, P.L.C.

(57) ABSTRACT

A method for realizing a convergent Wireless Local Area Networks (WLAN) Authentication and Privacy Infrastructure (WAPI) network architecture with a split Medium Access Control (MAC) mode involves the steps: a split MAC mode for realizing WLAN Privacy Infrastructure (WPI) by an access controller is constructed through splitting the MAC function and the WAPI function of the wireless access point apart to a wireless terminal point and the access controller; integration of a WAPI and a convergent WLAN network system architecture is realized under the split MAC mode that the access controller realizes WPI; the association connection process is performed among a station point, a wireless terminal point and an access controller; the process for announcing the start of performing the WLAN Authentication Infrastructure (WAI) protocol between the access controller and the wireless terminal point is performed; the process for performing the WAI protocol between the station point and the access controller is performed; the process for announcing the end of performing the WAI protocol between the access controller and the wireless terminal point is performed; the secret communication process is performed between the wireless terminal point and the station point by using WPI.

6 Claims, 1 Drawing Sheet

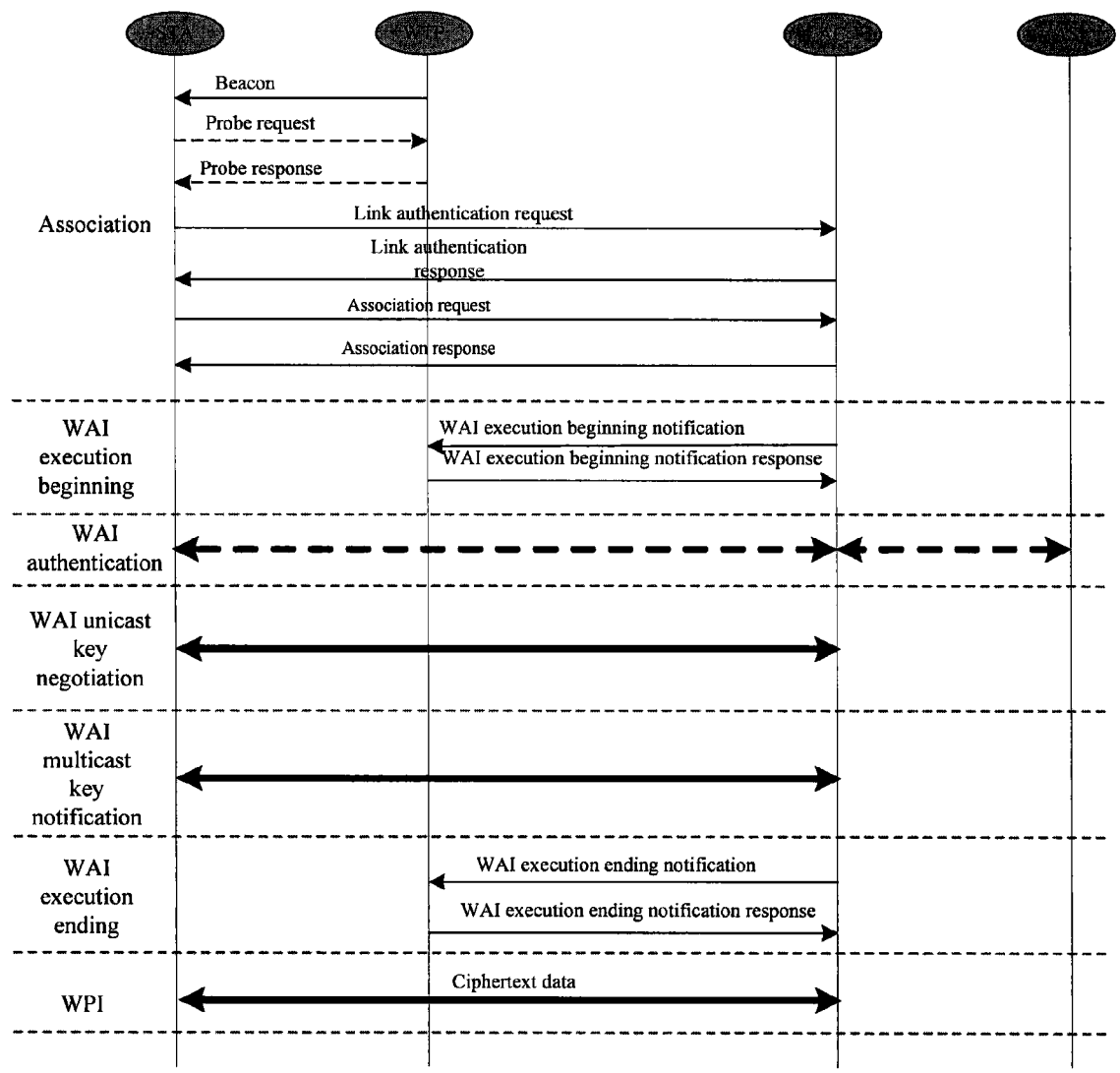

METHOD FOR REALIZING CONVERGENT WAPI NETWORK ARCHITECTURE WITH SEPARATE MAC MODE

CROSS REFERENCE TO RELATED APPLICATION

This application is a 371 U.S. National Stage Application of, and claims priority to, International Application No. PCT/CN2009/075536, filed on Dec. 14, 2009, which claims the priority of Chinese Patent Application No. 200910021423.0, entitled "METHOD FOR REALIZINGING CONVERGENT WAPI NETWORK ARCHITECTURE WITH SEPARATE MAC MODE", filed on Feb. 27, 2009 with State Intellectual Property Office of PRC, which applications are incorporated herein by reference in their entirety.

FIELD OF THE INVENTION

The present invention relates to a method for implementing a convergent WAPI network architecture in a split MAC mode.

BACKGROUND OF THE INVENTION

In a Wireless Local Area Network (WLAN) with autonomous architecture, a wireless Access Point (AP), which is completely deployed with and interfaced to WLAN functions, is a standalone entity in the network and should be managed independently. At present, WLAN Authentication and Privacy Infrastructure (WAPI) based WLANs all employ the autonomous architecture. However, with the increasing scale of the WLAN deployment, because of its following inherent drawbacks, the operation mode of the network with this autonomous architecture is becoming an obstacle restricting the development of wireless techniques.

Firstly, in the WLAN with the autonomous architecture, AP, as an Internet Protocol (IP) addressable device, should be managed independently, including monitoring, configuring, controlling or the like. In large-scale network deployment, a large number of APs will bring huge management cost, and lead to heavy burden on the network. Such phenomena are more significant especially when the APs in the network are differently configured and managed, which will definitely obstruct the development of wireless techniques.

Secondly, in the WLAN with autonomous architecture, it is difficult to ensure the consistency of all configuration parameters of the AP, because among the configuration parameters of the AP, besides static parameters, most are parameters to be dynamically configured. In a large-scale WLAN, updating the dynamic configurations of APs in the whole network in time is an extremely heavy burden or is even impossible to be accomplished.

Thirdly, wireless transmission media in the WLAN are shared resources, and to improve the performance of the network, each of the APs has to be monitored in real time and the configuration of the AP has be dynamically updated based on the usage of the shared media. However, manually configuring the AP parameters related to the wireless transmission media is labor consuming and costly.

Fourthly, in the WLAN with autonomous architecture, secured access to the network and block of unauthorized APs are relatively difficult, because in most cases the AP is hard to be protected due to its deployment position, and once the AP is stolen, loaded security information such as key will be leaked out and thus the network security will be threatened by an attacker via the security information.

In a word, in the WLAN with autonomous architecture, and particularly in large-scale deployment, monitoring, configuring and controlling of the APs will lead to heavy management burden on the network. Moreover, it is hard to maintain the consistency of the AP configuration. Furthermore, the co-operation of the APs in the network required for best network performance and minimum wireless interference due to the sharing and dynamic characteristics of the wireless transmission media imposes higher demand on the configuration management of the APs. Security is one of the key factors to be considered in designing a wireless network, and in the large-scale deployment, the security of the WLAN will encounter huge challenge. Thus, it is urgent to design a WAPI-based convergent WLAN network architecture, i.e. fit AP architecture of WAPI, since the operation mode of the WLAN with autonomous architecture can not meet the requirements of the large-scale network deployment.

SUMMARY OF THE INVENTION

The object of the present invention is to provide a method for implementing a convergent WAPI network architecture in a split Medium Access Control (MAC) mode in which a WLAN Privacy Infrastructure (WPI) is implemented by the Access Controller (AC), so to overcome the drawbacks of the above autonomous WLAN network architecture. According to the present invention, the centralized control and management of the APs in the whole network are achieved by splitting the MAC function and the WAPI function of the APs, thereby meeting the deployment requirements of the large-scale WLAN.

The present invention provides such a technical solution: a method for implementing a convergent WAPI network architecture in a split MAC mode, characterized in that the method includes the following steps:

1) constructing a split MAC mode in which a WPI is implemented by an access controller: splitting a MAC function and a WAPI function of a wireless access point to a wireless terminal point and the access controller respectively;

2) implementing an information interaction between WLAN entities in the split MAC mode in which the WPI is implemented by the access controller;

2.1) a process of associating a station with the wireless terminal point and the access controller;

2.2) a process of notifying a beginning of executing a WLAN Authentication Infrastructure (WAI) protocol between the access controller and the wireless terminal point;

2.3) a process of executing the WAI protocol between the station and the access controller;

2.4) a process of notifying an ending of executing the WAI protocol between the access controller and the wireless terminal point; and 2.5) a process of conducting a privacy communication by using the WPI between the access controller and the station.

Specifically, the above step 2.1) includes:

2.1.1) passively listening to a beacon frame of the wireless terminal point and obtaining parameters of the wireless terminal point including a WAPI information element, by the station; alternatively, actively sending a probe request frame to the wireless terminal point and obtaining the parameters of the wireless terminal point including the WAPI information element through a probe response frame sent from the wireless terminal point in receipt of the probe request frame, by the station, the WAPI information element including an authentication and key management kit and a password kit supported by the wireless terminal point;

2.1.2) sending a link authentication request frame to the access controller by the station, for requesting a link authentication with the access controller;

2.1.3) sending a link authentication response frame to the station by the access controller in response to the link authentication request frame of the station;

2.1.4) when the link authentication is successful, sending an association request frame to the access controller by the station, for requesting an association to the access controller, where the association request frame sent by the station includes the WAPI information element for determining the authentication and key management kit and the password kit selected by the station; and 2.1.5) resolving the association request frame sent by the station and sending an association response frame to the station, by the access controller.

Specifically, the above step 2.2) includes:

2.2.1) sending a WAI execution beginning notification to the wireless terminal point by the access controller, for notifying the wireless terminal point of information including a MAC address of the station, a WLAN ID and an authentication beginning identifier, in which the authentication beginning identifier is used for notifying the wireless terminal point to close a controlled port and to forward only the WAI protocol data from the corresponding station; and 2.2.2) sending a WAI execution beginning notification response message to the access controller by the wireless terminal point.

Specifically, the above step 2.3) includes:

2.3.1) a process of a WAI authentication between the access controller and the station;

2.3.2) a process of negotiating a WAI unicast key between the access controller and the station; and 2.3.3) a process of notifying a WAI multicast key between the access controller and the station.

Specifically, the above step 2.4) includes:

2.4.1) sending a WAI execution ending notification to the wireless terminal point by the access controller, for notifying the wireless terminal point of information including the MAC address of the station, the WLAN ID, an authentication ending identifier and the like, in which the authentication ending identifier is used for notifying the wireless terminal point to open the controlled port and to forward any data from the corresponding station, including the WAI protocol data and non-WAI protocol data; and 2.4.2) sending a WAI execution ending notification response message to the access controller by the wireless terminal point.

Specifically, the above step 2.5) includes:

2.5.1) ciphering and sending data intended for the station by the access controller; and 2.5.2) deciphering data originated from the station by the access controller.

The present invention provides a flow of communication interaction between entities with the convergent WLAN network architecture in the split MAC mode, in which the MAC function and the WAPI function of the AP are split to the Wireless Terminal Point (WTP) and the Access Controller (AC). Specifically, the WTP implements the real-time information interaction with the Station (STA), including the beacon frame, the response to probe request and the like, while the AC implements the non-real-time interaction with the STA, including the association, the WAPI protocol and the like. This mode for splitting the functions of AP is referred to as the split MAC mode in which the WPI is implemented by the AC. Compared with the prior art, the present invention has the following advantages: the present invention provides a method for implementing a convergent WAPI network architecture in a split MAC mode, which breaks the limitation that the existing WAPI protocol based autonomous network architecture can not meet the requirement of the large-scale WLAN deployment. With the split MAC mode, the unified monitoring, configuring and controlling of the WTPs by the AC are implemented, so that the centralized management of WTPs in the WLAN are achieved; by implementing the WAPI protocol by the AC, a seamless integration of the WAPI protocol and the convergent WLAN architecture is established, and the security of the WLAN is ensured. To sum up, the present invention not only satisfies the requirement of the large-scale WLAN deployment, but also ensures the security of the WLAN in the convergent architecture

BRIEF DESCRIPTION OF THE DRAWINGS

FIG. 1 is a chart of the message flow of a convergent WAPI network architecture in a split MAC mode in which WPI is implemented by AC.

DETAILED DESCRIPTION OF THE INVENTION

Referring to FIG. 1, in accordance with a preferred embodiment of the present invention, the method includes:

1) constructing a split MAC mode in which a WPI is implemented by an AC: splitting a MAC function and a WAPI function of AP to a WTP and the AC, respectively;

2) integrating the WAPI with the convergent WLAN network architecture in the split MAC mode in which the WPI is implemented by the AC;

2.1) associating a STA with the WTP and the AC;

2.1.1) the STA passively listening to a beacon frame of the WTP and obtaining related parameters of the WTP including a WAPI information element, for example, an authentication and key management kit and a password kit supported by the WTP; or the STA actively sending a probe request frame to the WTP and obtaining the related parameters of the WTP through a probe response frame sent from the WTP in receipt of the probe request frame, where the related parameters of the WTP includes the WAPI information element, for example, the authentication and key management kit and the password kit supported by the WTP;

2.1.2) after obtaining the probe response sent by the WTP, the STA sending a link authentication request frame to the AC, for requesting a link authentication with the AC;

2.1.3) the AC sending a link authentication response frame to the STA in response to the link authentication request frame of the STA;

2.1.4) when the link authentication is successful, the STA sending an association request frame to the AC, for requesting an association to the AC, where the association request sent by the STA includes the WAPI information element for determining the authentication and key management kit and the password kit selected by the station; and 2.1.5) the AC resolving the association request frame sent by the STA, and sending an association response frame to the STA;

2.2) notifying a beginning of executing a WAI between the AC and the WTP;

2.2.1) the AC sending a WAI execution beginning notification to the WTP, for notifying the WTP of information including a MAC address of the STA, a WLAN ID, an authentication beginning identifier and the like, in which the authentication beginning identifier is used for notifying the WTP to close a controlled port and to forward only the WAI protocol data from the corresponding STA; and 2.2.2) the WTP sending a WAI execution beginning notification response message to the AC;

2.3) executing the WAI protocol between the AC and the STA;

2.3.1) performing a WAI authentication between the AC and the STA;

2.3.2) performing a WAI unicast key negotiation between the AC and the STA; and 2.3.3) performing a WAI multicast key notification between the AC and the STA;

2.4) notifying an ending of executing the WAI between the AC and the WTP;

2.4.1) the AC sending a WAI execution ending notification to the WTP, for notifying the WTP of information including a MAC address of the STA, a WLAN ID, an authentication ending identifier and the like, in which the authentication ending identifier is used for notifying the WTP to open the controlled port and to forward any data from the corresponding STA, including the WAI protocol data and the non-WAI protocol data; and 2.4.2) the WTP sending a WAI execution ending notification response message to the AC;

2.5) conducting a privacy communication between the AC and the STA by using the WPI;

2.5.1) the AC ciphering and sending the data intended for the STA; and 2.5.2) the AC deciphering the data originated from the STA.

In the above embodiment, a secured channel can be prearranged between the AC and the WTP, and this secured channel can be established by constructing a private network between the AC and the WTP or by using security protocols (such as Datagram Transport Layer Security (DTLS) protocol).

What is claimed is:

1. A method for implementing a convergent Wireless Local Area Network Authentication and Privacy Infrastructure WAPI network architecture in a split Medium Access Control MAC mode, comprising:
   1) splitting a MAC function and a WAPI function of a wireless access point to a wireless terminal point and an access controller respectively, and constructing a split MAC mode in which a WLAN Privacy Infrastructure WPI is implemented by the access controller;
   2) achieving an integration of the WAPI and a convergent Wireless Local Area Network WLAN network architecture in the split MAC mode in which the WPI is implemented by the access controller, wherein the step 2) comprises:
   2.1) performing a process of associating a station with the wireless terminal point and the access controller;
   2.2) performing a process of notifying a beginning of executing a WLAN Authentication Infrastructure WAI protocol between the access controller and the wireless terminal point;
   2.3) performing a process of executing the WAI protocol between the station and the access controller;
   2.4) performing a process of notifying an ending of executing the WAI protocol between the access controller and the wireless terminal point; and
   2.5) performing a process of conducting privacy communication between the access controller and the station by using the WPI.

2. The method for implementing the convergent WAPI network architecture in the split MAC mode according to claim 1, wherein the step 2.1) comprises:

2.1.1) passively listening to a beacon frame of the wireless terminal point and obtaining parameters of the wireless terminal point comprising a WAPI information element, by the station; or, actively sending a probe request frame to the wireless terminal point and obtaining the parameters of the wireless terminal point comprising the WAPI information element through a probe response frame sent from the wireless terminal point in receipt of the probe request frame, by the station; the WAPI information element comprising an authentication and key management kit and a password kit supported by the wireless terminal point;

2.1.2) sending a link authentication request frame to the access controller by the station, for requesting a link authentication with the access controller;

2.1.3) sending a link authentication response frame to the station by the access controller in response to the link authentication request frame of the station;

2.1.4) when the link authentication is successful, sending an association request frame to the access controller by the station, for requesting an association to the access controller, wherein the association request frame sent by the station comprises the WAPI information element for determining the authentication and key management kit and the password kit selected by the station; and 2.1.5) resolving the association request frame sent by the station and sending an association response frame to the station, by the access controller.

3. The method for implementing the convergent WAPI network architecture in the split MAC mode according to claim 1, wherein the step 2.2) comprises:

2.2.1) sending a WAI execution beginning notification to the wireless terminal point by the access controller, for notifying the wireless terminal point of information comprising a MAC address of the station, a WLAN ID and an authentication beginning identifier, wherein the authentication beginning identifier is used for notifying the wireless terminal point to close a controlled port and to forward only the WAI protocol data from the corresponding station; and 2.2.2) sending a WAI execution beginning notification response message to the access controller by the wireless terminal point.

4. The method for implementing the convergent WAPI network architecture in the split MAC mode according to claim 1, wherein the step 2.3) comprises:

2.3.1) performing a process of a WAI authentication between the access controller and the station;

2.3.2) performing a process of negotiating a WAI unicast key between the access controller and the station; and 2.3.3) performing a process of notifying a WAI multicast key between the access controller and the station.

5. The method for implementing the convergent WAPI network architecture in the split MAC mode according to claim 1, wherein the step 2.4) comprises:

2.4.1) sending a WAI execution ending notification to the wireless terminal point by the access controller, for notifying the wireless terminal point of information comprising a MAC address of the station, a WLAN ID, and an authentication ending identifier, wherein the authentication ending identifier is used for notifying the wireless terminal point to open the controlled port and to forward any data from the corresponding station; and 2.4.2) sending a WAI execution ending notification response message to the access controller by the wireless terminal point.

6. The method for implementing the convergent WAPI network architecture in the split MAC mode according to claim 1, wherein the step 2.5) comprises:
   2.5.1) ciphering and sending data intended for the station by the access controller; and
   2.5.2) deciphering data originated from the station by the access controller.

\* \* \* \* \*